US006250984B1

(12) United States Patent
Jin et al.

(10) Patent No.: US 6,250,984 B1
(45) Date of Patent: Jun. 26, 2001

(54) ARTICLE COMPRISING ENHANCED NANOTUBE EMITTER STRUCTURE AND PROCESS FOR FABRICATING ARTICLE

(75) Inventors: Sungho Jin, Millington; Gregory Peter Kochanski, Dunellen; Wei Zhu, Warren, all of NJ (US)

(73) Assignee: Agere Systems Guardian Corp., Miami Lakes, FL (US)

( * ) Notice: Subject to any disclaimer, the term of this patent is extended or adjusted under 35 U.S.C. 154(b) by 0 days.

(21) Appl. No.: 09/236,966

(22) Filed: Jan. 25, 1999

(51) Int. Cl.$^7$ ........................................... H01J 9/04
(52) U.S. Cl. ......................... 445/51; 313/495; 313/306
(58) Field of Search ................... 445/24, 50, 51; 313/495, 496, 497, 306, 307, 308, 309

(56) References Cited

U.S. PATENT DOCUMENTS

| 4,940,916 | 7/1990 | Borel et al. . | |
|---|---|---|---|
| 5,089,742 | 2/1992 | Kirkpatrick et al. . | |
| 5,129,850 | 7/1992 | Kane et al. . | |
| 5,138,237 | 8/1992 | Kane et al. . | |
| 5,283,500 | 2/1994 | Kochanski . | |
| 5,681,196 | 10/1997 | Jin et al. . | |
| 5,698,934 | 12/1997 | Jin et al. . | |
| 5,773,834 | 6/1998 | Yamamoto et al. . | |
| 5,773,921 | 6/1998 | Keesmann et al. . | |
| 6,020,677 | * 2/2000 | Blanchet-Fincher | 313/336 |
| 6,083,624 | * 7/2000 | Hiura | 428/408 |
| 6,116,975 | * 9/2000 | Saito et al. | 445/24 |
| 6,146,227 | * 11/2000 | Mancevski | 445/24 |
| 6,146,230 | * 11/2000 | Kim et al. | 445/51 |

FOREIGN PATENT DOCUMENTS

| 4405768A1 | 2/1994 | (DE) . |
|---|---|---|
| 0905737 | 3/1999 | (EP) . |
| WO9600974 | 1/1996 | (WO) . |
| WO9718577 | 11/1996 | (WO) . |
| WO9811588 | 3/1998 | (WO) . |

OTHER PUBLICATIONS

Fishbine, B.H. et al., "Buckytube Cold Field Emitter Array Cathode Experiments" *Materials Research Society Symposium Proceedings*, vol. 359 (1995).

Rinzler, A.G. et al., "Unraveling Nanotubes: Field Emission From An Atomic Wire", *Science, U.S. American Association For The Advancement Of Science*, vol. 269, pp 1550–1553 (1995).

Heer De, W.A., "Aligned Carbon Nanotube films: Production and Optical and Electronic Properties", *Science*, vol. 268, pp. 845–847 (1995).

Wang, Q. H. et al., "Field emission from nanotube bundle emitters at low fields", *Appl. Phys, Lett.* 70 (24), pp. 3308–3310 (1997).

(List continued on next page.)

*Primary Examiner*—Kenneth J. Ramsey
*Assistant Examiner*—Matthew J. Gerike
(74) *Attorney, Agent, or Firm*—Scott J. Rittman

(57) ABSTRACT

An improved process for fabricating nanotube field emitter structures is provided, in which the nanotubes protrude from a supporting base material to improve emission properties. The resulting emitter structure are useful in a variety of devices, including microwave vacuum tube devices and flat-panel, field-emission displays. To attain the protruding nanotube emitter structure, according to one embodiment of the invention, nanotubes and metal particles are mixed and consolidated into a compact, and the compact is then sectioned to expose a substantial number of nanotube ends. A layer of the metal is selectively etched from the sectioned surface, leaving the exposed nanotubes protruding from the surface. The extent of protrusion is at least twice the average diameter of the nanotubes, advantageously at least ten times the average diameter of the nanotubes.

22 Claims, 5 Drawing Sheets

OTHER PUBLICATIONS

Yakobson, B.I. et al., "Fullerene Nanotubes: $C_{1,000,000}$ and Beyond" *American Scientist*, vol. 85 p. 324 (1997).

Bonard, J–M. et al., "Field emission from single–wall carbon nanotube films", *Appl. Phys. Lett.*, vol. 73, No. 7, pp. 918–920 (1998).

Bonard, J–M. et al., "Field–Emission–Induced Luminescence from Carbon Nanotubes", *Physical Review Lett.*, vol. 81, No. 7, pp. 1441–1444 (1998).

Collins, P.G. et al., "Unique characteristics of cold cathode carbon–nanotube–matrix field emitters" *Physical Review B*, vol. 55, No. 15, p. 9391 (1997).

Collins, P.G. et al., "A simple and robust electron beam source from carbon nanotubes", *Appl. Phys, Lett.* No. 69 (13) pp. 1969–1971 (1996).

Saito, Y. et al. "Field Emission Patterns from Single–Walled Carbon Nanotubes", *Jpn. J. Appl. Phys.* vol. 36 (1997).

*Semiconductor International*, p. 44 (1998).

Li, W.Z. et al., "Large–Scale Synthesis of Aligned Carbon Nanotubes", *Science*, vol. 274, pp. 1701–1703 (1996).

Ren, Z.F. et al. "Synthesis of Large Arrays of Well–Aligned Carbon Nanotubes on Glass," *Science*, vol. 282, pp. 1105–1107 (1998).

De Heer, W.A. et al., "Aligned Carbon Nanotube Films: Production and Optical and Electronic Properties", *Science*, vol. 268, pp. 845–847 (1995).

Scott, A.W., *Understanding Microwaves*, Ch. 12, John Wiley & Sons (1993).

*Semiconductor International*, p. 46 (1991).

Spindt, C.A. et al., "Field–Emitter Arrays for Vacuum Microelectronics", *IEEE Transactions on Electron Devices*, vol. 38, 2355 (1991).

*Advances in Electronics and Electron Physics*, edited by Peter W. Hawkes, vol. 83, p. 75 (1992).

Costellano, J.A., *Handbook of Display Technology*, Academic Press, p. 254 (1992).

Rinzler, et al., "Unraveling Nanotubes: Field Emission from an Atomic Wire", *Science*, vol. 269, 1550 (1995).

DeHeer et al.,"A Carbon Nanotube Field–Emissin Electron Source", *Science*, vol. 270, 1179 (1995).

Saito, et al., "Cathode Ray Tube Lighting Elements with Carbon Nanotube Field Emitters", *Jpn. J. Appl. Phys.*, vol. 37, L346 (1998).

Wang et al., "A nanotube–based field–emission flat panel display", *Appl. Phys. Lett.*, vol. 72, No. 22, 2912 (1998).

\* cited by examiner

FIG. 1

| MIX NANOTUBES AND METAL POWDER | b |
| PRESS COMPACT, AND MELT OR SINTER INTO AN INGOT FORM | c |
| CUT OR GRIND THE INGOT TO CREATE INCREASED NUMBER OF NANOTUBE TIPS | d |
| SHAPE THE INGOT INTO DESIRED COLD CATHODE CONFIGURATION | e |
| ETCH SURFACE TO CREATE PROTRUDING NANOTUBE TIPS ON THE INGOT | f |
| OPTIONALLY REMELT METAL SURFACE TO ALIGN THE PROTRUDING NANOTUBES | g |
| ASSEMBLE INTO FIELD EMITTER DEVICE | |

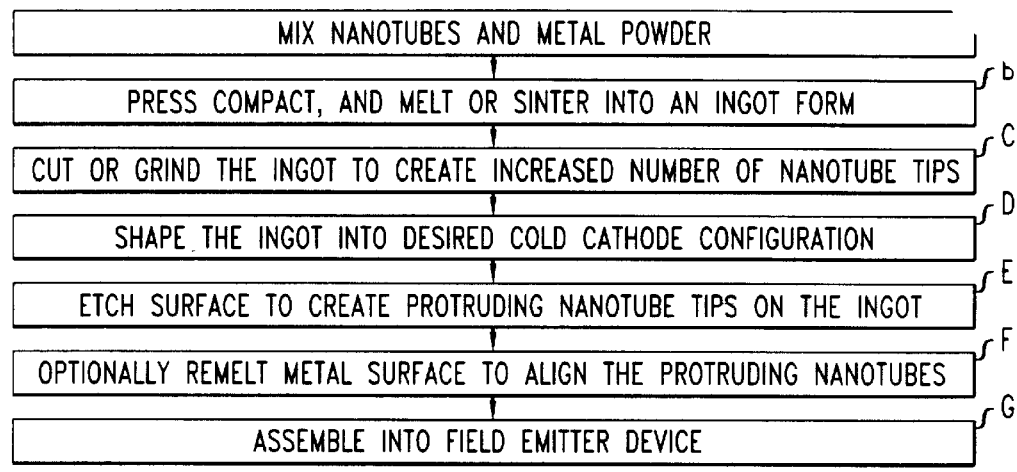

FIG. 2A

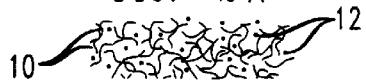

FIG. 2B

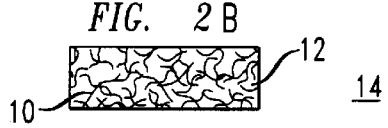

FIG. 2C

FIG. 2D

FIG. 2E

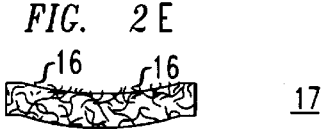

FIG. 2F

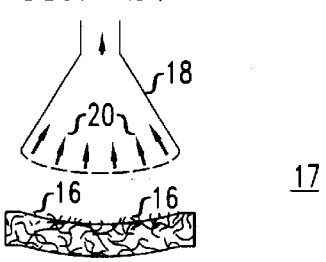

ARTICLE COMPRISING ENHANCED NANOTUBE EMITTER STRUCTURE AND PROCESS FOR FABRICATING ARTICLE

BACKGROUND OF THE INVENTION

1. Field of the Invention

This invention pertains to devices comprising electron field emitters, in particular, field emitters containing carbon nanotubes.

2. Discussion of the Related Art

Electron field emitters are useful for a variety of applications including microwave-amplifiers and flat-panel, field-emission displays.

Microwave vacuum tube devices, such as power amplifiers, are essential components of many modern microwave systems including telecommunications, radar, electronic warfare, and navigation systems. While semiconductor microwave amplifiers are available, they generally lack the power capabilities required by most microwave systems. Microwave tube amplifiers, in contrast, provide microwave energy at much higher power levels. The higher power levels of tube devices are the result of the fact that electrons travel at a much higher velocity in a vacuum than in a semiconductor. The higher speed permits use of larger structures with the same transit time. Larger structures, in turn, permit greater power levels.

Microwave tube devices typically operate by introducing a beam of electrons into a region where the beam interacts with an input signal, and then deriving an output signal from the modulated electron beam. See, e.g., A. W. Scott, *Understanding Microwaves,* Ch. 12, John Wiley & Sons (1993), the disclosure of which is hereby incorporated by reference. Microwave tube devices include traveling wave tubes, gridded tubes, klystrons, cross-field amplifiers and gyrotrons. The usual source of electrons for microwave tube devices is a thermionic emission cathode, typically formed from tungsten cathodes, optionally coated with barium oxide or mixed with thorium oxide. The cathode is heated to a temperature around 1000° C. to produce thermionic electron emission on the order of amperes per square centimeter.

The requisite heating of thermionic cathodes causes a number of problems. Cathode lifetime is limited because key constituents of the cathode, such as barium oxide, evaporate under the high operating temperatures, and when the barium is depleted, the cathode (and hence the tube) no longer perform. Many traveling wave tubes (TWTs), for example, have operating lives of less than a year. Also, the need to raise the cathode to the operating temperature causes emission delays of up to several minutes, which is not acceptable for most commercial applications. In addition, the high temperature operation generally requires a peripheral cooling system, such as a fan, thereby increasing the size of the overall device or system. It would therefore be desirable to develop microwave tube devices that do not require such high temperature operation, e.g., cold cathode devices.

Another promising application of field emitters is thin, matrix-addressable, flat panel displays. See, for example, *Semiconductor International,* December 1991, p.46; C. A. Spindt et al., *IEEE Transactions on Electron Devices,* Vol. 38, 2355 (1991); I. Brodie and C. A. Spindt, *Advances in Electronics and Electron Physics,* edited by P. W. Hawkes, Vol. 83, pp. 1 (1992); and J. A. Costellano, Handbook of Display Technology, Academic Press, 254 (1992); and U.S. Pat. Nos. 4,940,916; 5,129,850; 5,138,237 and 5,283,500, the disclosures of which are hereby incorporated by reference.

A variety of characteristics are known to be advantageous for cathode materials of field emission devices. The emission current is advantageously voltage controllable, with driver voltages in a range obtainable from "off the shelf" integrated circuits. For typical device dimensions (e.g. 1 $\mu$m gate-to-cathode spacing), a cathode that emits at fields of 25 $\mu$m or less is generally desirable for typical CMOS circuitry. The emitting current density is advantageously in the range of 1–10 mA/cm$^2$ for flat panel display applications and >100mA/cm$^2$ for microwave power amplifier applications. The emission characteristics are advantageously reproducible from one source to another and advantageously stable over a very long period of time (tens of thousands of hours). The emission fluctuations (noise) are advantageously small enough to avoid limiting device performance. The cathode is advantageously resistant to unwanted occurrences in the vacuum environment, such as ion bombardment, chemical reaction with residual gases, temperature extremes, and arcing. Finally, the cathode manufacturing is advantageously inexpensive, e.g. no highly critical processes and adaptable to a wide variety of applications.

Conventional field emission cathode materials are typically made of metal (such as Mo) or semiconductor material (such as Si) with tips of submicron size. While useful emission characteristics have been demonstrated for these materials, the control voltage required for emission is relatively high (around 100 V) because of their high work functions and relatively dull (i.e., insufficiently sharp) tips. This high voltage operation increases the damaging instabilities due to ion bombardment and surface diffusion on the emitter tips and necessitates high power densities to be supplied from an external source to produce the required emission current density. The fabrication of uniform sharp tips is difficult, tedious and expensive, especially over a large area. In addition, the vulnerability of these materials to conditions of a typical operating environment, e.g., ion bombardment, reaction with chemically active species, and temperature extremes, is of concern.

Carbon materials (diamond and carbon nanotubes) have recently emerged as potentially useful electron field emitters. Diamond offers advantages due to the negative or low electron affinity on its hydrogen-terminated surfaces, but the technological advances have been somewhat slow because of emission non-uniformity and the tendency for graphitization in diamond emitters at increased emission currents, e.g., above about 30 mA/cm$^2$.

Carbon nanotubes feature a high aspect ratio (>1,000) and a small tip radii of curvature (~5–50 nm). These geometric characteristics, coupled with the high mechanical strength and chemical stability of the tubules, make carbon nanotubes attractive as electron field emitters. See, e.g., German patent No. 4,405,768; Rinzler et al., *Science,* Vol. 269, 1550 (1995); De Heer et al., *Science,* Vol. 270, 1179 (1995); Saito et al., *Jpn. J. Appl. Phys.,* Vol. 37, L346 (1998); Wang et al., *Appl. Phys. Lett.,* Vol. 70, 3308 (1997); Saito et al., *Jpn. J. Appl. Phys.,* Vol. 36, L1340 (1997); and Wang et al., *Appl. Phys. Lett.,* Vol. 72, 2912 (1998), the disclosures of which are hereby incorporated by reference. However, carbon nanotubes are typically available in the form of needle-like or spaghetti-like powders which are not easily or conveniently incorporated into a field emitter device structure. And due to this random configuration, the electron emission capabilities are not fully utilized. In addition, adherence of thin film nanotubes to a conductive substrate is problematic because the nanotube material is usually free of dangling bonds and high energy sites, making chemical bonding to the substrate difficult.

Processes which allow relatively easy fabrication of adherent and stable carbon nanotube field emitter structures, advantageously providing a substantial number of nanotube ends oriented toward a single direction, are therefore desired.

SUMMARY OF THE INVENTION

The invention provides an improved process for fabricating carbon nanotube field emitter structures, in which the nanotubes protrude from a supporting base material to provide desired emission properties. The resulting emitter structures are useful in a variety of devices, including microwave vacuum tube devices and flat-panel, field-emission displays. To attain the protruding nanotube emitter structure, according to one embodiment of the invention (reflected in FIGS. 2A–2F), nanotubes and a conductive material, e.g., metal particles, are mixed and consolidated into a compact, and the compact is then sectioned to expose a substantial number of nanotube ends (see FIG. 2C). A layer of the metal is selectively etched from the sectioned surface, leaving the exposed nanotubes protruding from the surface. The extent of protrusion is at least twice the average diameter of the nanotubes, advantageously at least ten times the average diameter of the nanotubes. It is also possible to align the nanotubes in a desired direction.

The resultant structure offers several advantageous properties. First, the protrusion of the nanotubes from the conductive surface, in combination with the sharp edges created by the sectioning step, offer improved field emission. Second, by intermixing nanotubes and metal to form a composite and then sectioning the composite, it is possible to attain a surface having a higher density of nanotube ends compared to a technique in which one attempts to directly attach nanotubes to a metal surface, particularly where the nanotubes are long and tangled. Third, the sectioning and etching steps provide protruding nanotubes of relatively uniform height. This uniformity is advantageous in that it increases the number of nanotubes participating in emission, thereby producing a higher emission current. Fourth, the metal/nanotube composite material offers relatively stable electrical and mechanical contact between the nanotube emitters and the underlying metal cathode. This contact provides efficient electron transport to the emitter surface with low resistive heating, and also improves the reliability of the overall emitter structure, e.g., during temperature fluctuations and other stresses. Moreover, all these advantages are attained by a straightforward process readily adaptable to a variety of commercial applications.

In addition, the invention provides an improved emission gate structure utilizing such nanotube emitters. Specifically, when using nanotube-based cold cathodes in microwave vacuum tube devices, it is desired to keep electron beam spread with a reasonable level, and the gate structure of the invention reduces beam divergence. As reflected in FIG. 9, a multilayer, apertured grid having alternating gate conductor layers (100A–100D) and insulating layers (101A–101D) is used. The first grid is operated at a negative potential, which reduces the electric field at the cathode surface, near the edge of the aperture 102, and thereby suppresses emission from nanotube emitters 103 located at the edge of the aperture. Successive grids typically exhibit positive voltages relative to the cathode.

BRIEF DESCRIPTION OF THE DRAWINGS

FIG. 1 is a flow diagram of a process for making a field emitter structure with protruding nanotubes according to the invention;

FIGS. 2A–2F schematically show a nanotube emitter fabrication process according to the invention;

DETAILED DESCRIPTION OF THE INVENTION

Nanotube Emitter Structure and Fabrication Method

Figure 3A:
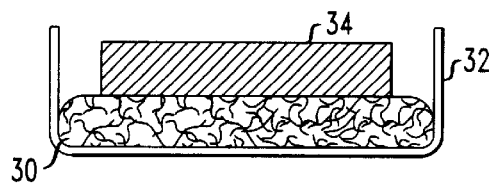
FIGS. 3A–3D schematically show another fabrication method of the invention.
Figure 3B:
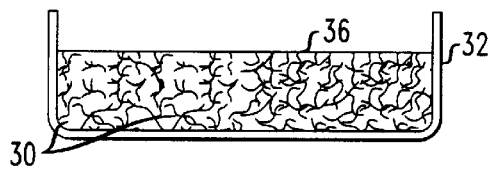

In design and fabrication of efficient, powerful, and reliable field emitters, high values for three parameters are generally sought: emitter density, field-concentrating structure, and the stability of emitter-to-electrode contact. The role of these parameters are as follows.

High emission current density is desirable, and is capable of being attained by increasing the density of nanotubes on the emitter surface. Providing a high-density of carbon nanotubes on an emitter surface has been relatively difficult, in part because nanotubes generally resemble an aggregate of loosely-tangled needles or spaghetti-shaped wires of non-uniform height, and in part due to the problems of attaching nanotubes to a conducting substrate.

Electron field emission is enhanced when the geometrical feature of the emitter is made small, due to the concentration of electrical field near sharp tips. Carbon nanotubes' small diameter, e.g., as small as 1.3 nm, provides an effective field concentrating feature. However, the ends of the nanotubes, especially if they are freshly broken, provide even smaller radii of curvature for enhanced field concentration and electron emission. In fact, electron emission from nanotube tips is easier than emission from the sides, e.g., tip emission occurs at much lower field levels. It is thus advantageous to form a nanotube field emitter structure having an increased number of nanotube ends exposed, advantageously where ends point toward the anode. However, the nanotube tip, if embedded in a conductive material (i.e., completely surrounded by the material except for the tip), does not provide the desired field concentration. For example, if a composite structure consisting of carbon nanotube and a metal matrix is utilized, the nanotubes are advantageously made to protrude beyond the surface of the composite structure by at least about the dimension of the tip radius of curvature, in order to have the desired field concentration effect. For enhanced field emission, it is advantageous for the nanotubes to protrude by much more than the tip radius, to increase the field concentration and induce useful levels of emission at lower applied fields that current emitters. Excessive protrusion, however, is not desirable due to increased electrical resistance (i.e., increased difficulty of electron supply) from the conductive matrix to the nanotube ends. In addition, the longer the protrusion, the higher the likelihood of encountering a structure defect, e.g., high resistivity regions, along the nanotube length. Generally, the length of protrusion is therefore less than 10 $\mu$m, more advantageously less than 1 $\mu$m.

Another important structural feature of a nanotube field emitter having protruding nanotubes is the height of the tips from the surface of the substrate. The uniformity of protrusion is important in order to increase the number of nanotube tips participating in emission. Specifically, because of the shielding of local electrical field by the highest protruding tips, the contribution to the field emission would be dominated by these highest tips, with nearby, less protruding, tips making a reduced contribution. Thus, the average variation in protrusion is advantageously less than a factor of two.

In addition to high current density and electron field emission, stable electrical and mechanical contact of the nanotube emitters to the cathode electrode is desired. Such stable contact provides efficient electron transport to the emitter surface with low resistive heating, and also improves the reliability of the emitter structure, e.g., by providing sufficient heat dissipation from the emitting nanotubes. This is particularly important for commercial applications, where there exist unavoidable, repeated interface stresses, induced, for example, by thermal expansion mismatch of materials involved during ambient temperature fluctuation or during repeated on-off operation of the field emitter device.

For these reasons, the nanotube field emitters of the invention have structure that provides improved emitter density, emission current density, electrical contact, and reliability. The fabrication of the emitter structures is as follows.

FIG. 1 is a block diagram of fabrication steps for construction of a bulk-type nanotube field emitter structure according to one embodiment of the invention, and FIGS. 2A–2F illustrate such steps. As shown in FIG. 1, block A, and FIG. 2A, the first step in making the field emitter structure is to provide the carbon nanotubes 10 and conductive material powder 12 and mix the two, advantageously as uniformly as practically possible. (Conductive material indicates that after consolidation, as discussed below, the conductive material exhibits a resistivity less than 1000 ohm-cm (advantageously less than 1 ohm-cm).)

Carbon nanotubes are typically in the form of high-aspect-ratio fibers resembling tangled spaghetti or needles. They are prepared by a number of different synthesis techniques including arc discharge, chemical vapor deposition, and laser ablation. Single wall nanotubes exhibit a typical diameter on the order of 1 to 5 nm, and are often made in the form of a bundle. Multi-wall nanotubes contain many concentric graphite cylinders and exhibit a typical diameter on the order of 10 to 50 nm. The aspect ratio for both types is typically 100 to 10,000, and both types tend to have sharp, field-concentrating tips useful for electron field emission.

Suitable conductive materials include a variety of industrially available metal or alloy powers, although it is possible to use conductive ceramics or conductive polymers. For efficient mixing with the generally small-dimensioned nanotubes, extremely fine metal powders are desirable, e.g., having an average diameter or an average, smallest dimension of less than about 1 $\mu$m, advantageously less than 0.2 $\mu$m. Because submicron particles of metals and alloys are easily oxidizable and sometimes pyrophoric, care must be taken in handling such ultrafine particles, e.g., by using an inert atmosphere (e.g., argon or helium gas) or a reducing environment (e.g., hydrogen). Noble metals, e.g., Au, Ag, Pd, Pt, or their alloys are less susceptible to such an oxidation problem. If carefully handled, it is possible to use powders containing non-noble metals such as Cu, Ni, Fe, Co, Mo, W, V, Si, Ti and their alloys. To allow low temperature processing, it is possible to use low melting point metals such as Sn, Al, Sb, In, Bi, Pb and their alloys, or conventional low melting point solders such as Sn-Bi, Sn-In, Sn-Ag, Sn-Sb, Au-Sn. It is also possible to use powders of metal-like ceramics (which exhibit the above-noted electrical conductivity subsequent to consolidation), such as Y-Ba-Cu-O or certain types of ferrites, as long as the nanotube-ceramic mixture is able to be sintered into a body with acceptable mechanical integrity. (As used herein, the term metal powder is intended to include such metal-like ceramics or mixtures of metal and such ceramic powders.) While the use of such a conductive metal matrix is advantageous due to the relative ease of electrical and thermal transport, the use of non-conductive matrices is also possible. Specifically, when the volume fraction of nanotubes is more than a few percent, it is possible for there to exist substantial physical and electrical contact between a cathode electrode base and emitting nanotubes tips and/or among tangled nanotubes, such contact allowing sufficient electron transport. It is therefore possible for the conductivity to be provided by the nanotubes themselves and/or the presence of a conductive matrix.

The mixing of nanotubes and metal powders is performed, for example, by a dry process, such as stirring or ball milling, or by a wet process such as forming a powder-mix slurry incorporating a liquid capable of being evaporated (e.g., alcohol, acetone, water), optionally with the addition of a binder for viscosity control and improved mixing.

One difficulty encountered in mixing the nanotubes and metal powder is the mismatch of the physical dimensions. The nanotube powders are extremely fine (e.g., 5–50 nm in diameter) and have a large surface area. Industrially available metal powders, however, tend to have diameters in the range of 200 to 1000 nm, which is more than an order of magnitude larger than the nanotube diameter. Simply mixing these two materials often results in nonuniform mixing. A solution to this problem is to dissolve the metal powder in an acid solution (or a base solution), e.g., dissolving Cu in hydrochloric, sulfuric or nitric acid, or dissolving a metal salt in water or solvent, e.g., $CuCl_2$, $CuSO_4$, or $AgNO_3$ in water, and then soak the nanotube powder aggregate with the solution. A capillary reaction within the nanotube aggregate draws in the low viscosity solution to provide nanoscale mixing, thereby more uniformly distributing the metal-containing solution within the network of nanotube aggregate. The resultant mixture is then dried and sintered in a reducing atmosphere, e.g., in a hydrogen containing atmosphere or an inert gas atmosphere such as argon, to convert the metal salt into metallic material. It is possible to use a mixture of at least two metal salts, such that the resultant alloy exhibits desired mechanical, thermal and electrical properties.

Typically, the melting temperature of the conductive material is at least 150° C., advantageously at least 200° C., more advantageously at least 300° C., to provide stability against inadvertent melting or softening, or recrystallizationcoarsening, during high-power operation of the emitters. However, to maintain relative ease of sintering or melt-processing, the melting point is advantageously no more than 1100° C., more advantageously no more than 700° C. To promote good mechanical and electrical contact, the metal alloy advantageously contains a nanotube-wettable element such as indium, bismuth, or lead, or carbide-forming elements such as Ti, Mo, V, W, Si, Cr, Fe, Nb, Ta, and Hf (used under appropriate gas environment). (As used herein, nanotube-wetting element indicates an element having the ability to form an interface and bond to a nanotube without exhibiting balling with high contact angles.)

A suitable alloy salt solution for nanotube field emitter fabrication, which produces a nanotube-wettable alloy with desirable strength and melting point (300° to 700° C.) is a mixed solution of copper chloride, indium chloride and silver chloride dissolved in water. A nanotube powder aggregate is soaked with this mixed salt solution, dried, pressed, heated to decompose the salt, and consolidated into a Cu-Ag-In alloy by sintering or melting to form the composite material.

Another approach to provide relatively uniform mixing of nanotubes with coarse metal particles, is to use extremely fine, nanoscale (5 to 50 nm in diameter) powders of oxides or other ceramic forms of the desired metallic components. Such nanosized oxide particles are generally stable, not pyrophoric, and are more readily available. After mixing, the material is generally pressed into a compact, and then sintered to convert the ceramic to the corresponding metal or alloy. Another approach to attaining uniformity is to use elements that exhibit a strong chemical wettability of nanotubes. Upon heating the nanotube-metal powder composite to the melting point of the metallic component, the nanotube-wetting melt substantially penetrates vacant space among the nanotubes.

The next step (block B) in FIG. 1, illustrated in FIG. 2B, is to press the composite material into a green compact 14, although such step is optional depending on the particular materials being used. The pressing is advantageously conducted in an inert or reducing gas atmosphere to avoid the trapping of air or oxygen which might oxidize the metal surface or damage the nanotube surface during subsequent sintering process. If the metal powder used is relatively soft and ductile, such as in the case of Ag, Au or Sn, it is possible for a cold welding to occur among the metal particles, such that the as-pressed compact will exhibit sufficient mechanical integrity to be used without sintering or further processing. A sintering process of the compact 14 is generally performed, typically at about 0.5–0.8 $T_m$ ($T_m$=melting point of the metal portion of the compact 14 in absolute temperature) to improve the mechanical consolidation and integrity of the compact 14, thereby forming what is referred to herein as an ingot.

Instead of the sintering process, it is possible to perform melting and solidification to consolidate the pressed compact 14 into an ingot. In such a case, to avoid segregation of the nanotube from the molten metal (due to density differences), the metal should be selected to adequately wet the nanotubes, as discussed previously.

The fabrication process of the invention allows incorporation of a relatively large volume fraction of nanotubes, if desired, in the metallic matrix. The volume of nanotubes is typically at least $10^{-7}$ volume fraction of the matrix, advantageously $10^{-5}$ to a depth of at least 2 μm from the surface from which the nanotubes protrude (see below). To provide desirable field concentration, the density of protruding nanotubes is typically below 50 vol. %, advantageously below 10 vol. %.

The next step in FIG. 1 (block C), illustrated in FIG. 2C, is to section the ingot parallel to the intended emitter surface, or grind off a layer of composite material from the ingot surface to expose an increased number of nanotubes. Carbon nanotubes tend to exhibit a long, tangled configuration, and the sectioning or grinding creates a higher number of broken nanotube cross-sections, i.e., broken ends, in the sectioned ingot 15, which is desirable for enhanced field emission. (Broken nanotube ends are exposed tips that were originally part of the interior length of the nanotube, as illustrated in FIG. 2C.) The sectioning process also creates a relatively uniform height for all the exposed nanotube tips (which are made to protrude upon subsequent processing). This relative uniformity in height is desirable for increasing the number of participating nanotubes, as discussed previously.

As noted in FIG. 1, block D, and illustrated in FIG. 2D, the sectioned ingot 17 is then subjected to an optional shaping into a desired cathode configuration if a non-flat configuration is desired. For example, a sectioned ingot 17 having a substantially flat sectioned surface is capable of being reshaped to exhibit a concave surface, to increase the effective emission area and to partially focus the emitted electron beam. It is also possible to add side flabs or screw holes for electrical connection or mechanical fixing purpose. Depending on the ductility of the nanotube-metal composite, it is possible to use cold stamping, press forging, hot forging, machining or grinding process for such shaping operations.

The next step in FIG. 1 (block E), illustrated in FIG. 2E, is to etch a layer of the metal from the ingot 17 surface, by a technique which has little effect on the nanotubes, to provide a multitude of protruding nanotubes 16. Typically, chemicals such as an acid are used. For improved control, it is also possible to use electropolishing. Alternatively, if the metal in the composite has a relatively high vapor pressure, surface evaporation of the metallic component (e.g., by surface heating or melting) is also capable of exposing the nanotubes 16. For field concentration purposes, the tip protrusion is typically at least about the average diameter of the nanotubes, and, for the purpose of utilizing additional electron emission from the nanotube sides, the length of the protrusion is advantageously at least 2 times the average nanotube diameter and more advantageously at least 10 times the average diameter. The exposed nanotubes in the composite structure comprise at least $10^{-5}$%, advantageously $10^{-3}$ to 0.1%, of the surface area of the etched emitter surface.

The protruding portions of the nanotubes are optionally aligned in substantially the same direction, with their length generally pointing upward, e.g., toward the anode (see FIG. 1, block F, and FIG. 2F). For example, it is possible to gently blow a hot gas (such as heated argon gas) down through a funnel-shaped gas-guiding chamber 18 with a perforated end surface toward the composite ingot 17 such that a layer of metal near the top surface is slightly melted. The flow direction of gas 20 is then reversed, e.g., by strong vacuum suction, such that the protruding nanotubes 16 align along the direction of gas flow, while the melted surface metal layer resolidifies to lock in the aligned nanotubes. It is also possible to use other techniques for surface melting e.g., laser heating, infrared heating, or resistive heating of the funnel end surface, as well as other alignment techniques. For example, it is possible to apply an electric field to electrostatically along the nanotubes before resolidification. (Aligned in substantially the same direction indicates that the average deviation of the long axis of the nanotubes from a line normal to the supporting surface at the point on the surface from which the nanotube protrudes, is less than 45°, as determined, for example, using high-resolution scanning electron microscopy.)

The last step in FIG. 1 (block G) is to assemble the emitter body with protruding nanotubes into a field emitting device by incorporating other components known in the art such as a gate structure, anode, phosphor screen (for a display device), electron beam focusing, guiding or accelerating components, various parts for providing and maintaining vacuum and structural stability, as well as components for electrical connections and thermal management, as discussed in more detail below.

Figure 3C:
Figure 3D:

As an alternative to the embodiment reflected in FIG. 1 and FIGS. 2A–2F, if materials that substantially wet the carbon nanotube surface are employed (e.g., In, Pb or Bi or alloys thereof under suitable oxidizing atmosphere, or carbide-forming materials such as listed above), it is possible to form the composite ingot by a simpler melt-infiltration approach, as illustrated in FIGS. 3A–3D. In this alternate approach, an aggregate of carbon nanotube tangles or powders 30, advantageously loosely packed for capillary infiltration of molten metal, is placed at the bottom of a crucible 32. A block 34 of metal that substantially wets nanotubes is placed on the nanotube aggregate 30, as shown in FIG. 3A. The metal 34 is then melted in an inert or reducing atmosphere, such that the molten metal substantially infiltrates the nanotube aggregate (see FIG. 3B). After the melt-infiltration and solidification is completed, the resulting ingot 38 is removed from the crucible, placed upside down, and then sectioned (or ground down) to expose an increased number of nanotubes, as illustrated in FIG. 3C. After sectioning, a layer of surface metal is etched off, as discussed previously, to provide protruding nanotubes 40 on the surface of the sectioned ingot 39.

It is also possible to provide a metallized surface layer on the nanotubes to promote wetting by a variety of molten metals including conventional solders. For example, it is possible to plate the nanotube surface with metals such as Ni, Cu, Ag or Au using techniques such as electroless plating, electroplating (e.g., with the nanotube powders continuously stirred and tumbled in the plating bath to repeatedly make contact with the plating electrode), evaporation in a fluidized bed furnace, physical vapor deposition, or chemical vapor deposition. The thickness of coated metal is typically at least 5 nm, advantageously at least 20 nm. The metallized nanotubes make alternative and simpler fabrication possible, e.g., compacting and melting a large volume of metallized nanotubes, without the need to incorporate additional metal.

Bulk emitter structures of the type illustrated in FIGS. 1–3 are useful for point-source electron emitter devices such as microwave amplifiers, but are not suitable for all applications. In particular, for devices such as an x–y matrix addressable field emission display, a multitude of emitters in the form of an x–y matrix array are required, and different fabrication approaches are therefore used. The block diagram of FIG. 4, along with FIGS. 5A–5D, illustrate such a fabrication process according to the invention suitable for thin film array emitters. The first step in FIG. 4 (block A), shown in FIG. 5A, is to provide nanotubes 50, which are advantageously fragmented. It is possible to use bare nanotubes, but metallized nanotubes, fabricated as discussed previously, are advantageous due to their improved wettability.

Figure 4:
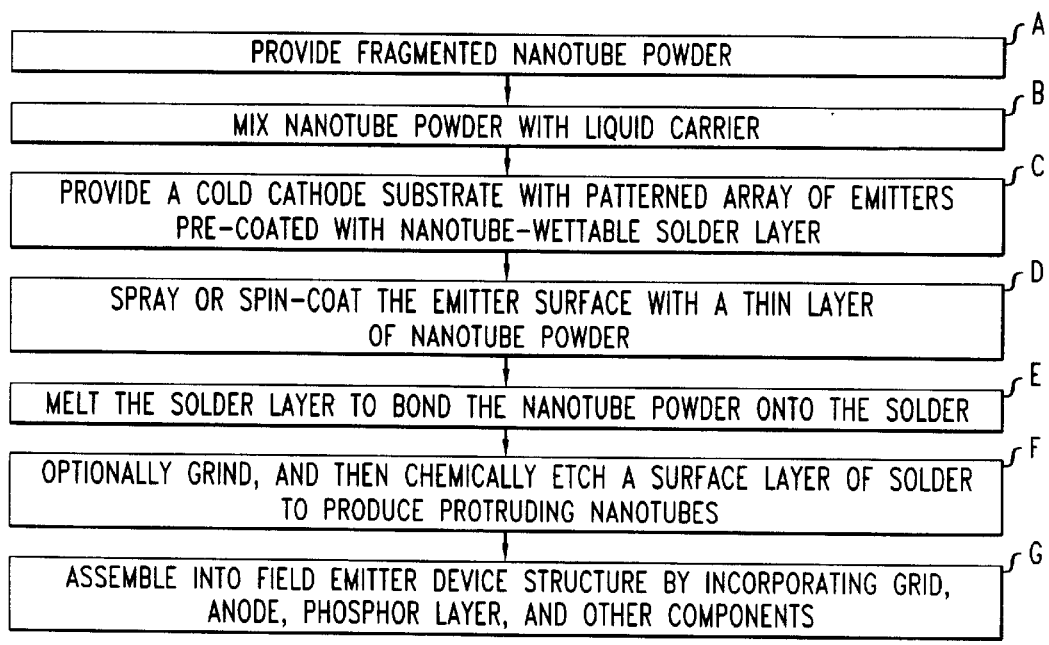
FIG. 4 is a flow diagram for preparing an x–y matrix arrayed nanotube field emitter according to the invention.
Figure 5A:
FIGS. 5A–5D schematically illustrates a nanotube array emitter fabrication process according to the invention.
Figure 5B:

The next step in FIG. 4 (block B), shown in FIG. 5B, is to mix the nanotubes 50 with a liquid carrier 52 such as alcohol, acetone or water, to form an emulsion or slurry. To increase the viscosity of the mixture for improved wetting of the substrate, and to coat at a relatively uniform thickness, one or more binders are optionally added, e.g., 1–30 vol. % polyvinyl alcohol (PVA). The binder, organic or inorganic, should be capable of subsequent removal, e.g., through decomposition by heating or evaporation.

Figure 5C:
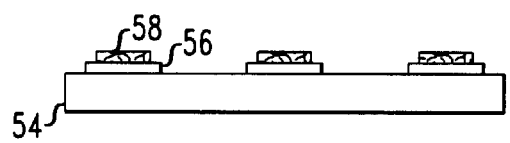

The next step in FIG. 4 (block C), shown in FIG. 5C, is to provide a cold cathode substrate with a patterned array of emitters. The substrate 54 is generally a silicon wafer or a flat, polished metal, ceramic or glass plate. The area of each emitter in the lithographically patterned array is, for example, 100×100 $\mu$m for a flat panel display application. Each emitter area of the substrate 54 (or pixel in the case of display devices) is coated with an electrically conductive metal pad for electrical connection, and is additionally coated with a thin, uniform layer of nanotube-wettable solder 56 by a suitable technique. The thickness of the solder metallic layer is typically at least 1 $\mu$m, advantageously at least 10 $\mu$m, to ease handling during subsequent surface etching.

The next step in FIG. 4 (block D), also reflected in FIG. 5C, is to deposit the nanotube-containing emulsion or slurry 58 onto the patterned solder areas 56, by a technique such as spray-coating, spin-coating or doctor-blade coating. The patterning of the coating is performed by conventional methods, e.g., the use of a patterned mask. As presented in FIG. 4, Block E, and FIG. 5D, the coated nanotubes, after the solvent dries and the binder material, if any, is burned off, are then bonded onto the underlying solder area 56, by melting the solder. Because wettability is provided by the use of nanotube-wettable solder and/or the use of metallized nanotubes, the nanotubes 58 partially submerge into the molten solder and will form suitable adhesion and electrical contact after the metal solidifies. Excess nanotube particles that are not bonded onto the solder layer are brushed or vacuumed away, or removed by polishing of the top surface of the emitter structure. Alternatively, it is possible for the nanotube-containing emulsion or slurry to contain metal particles to promote adherence upon the melting of the solder area 56.

Figure 5D:
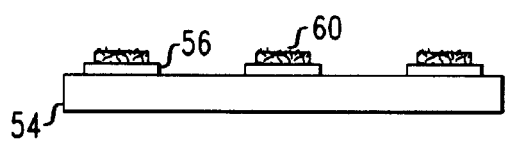

The next step in FIG. 4 (block F), shown in FIG. 5D, is to provide protruding nanotubes 60 from the surfaces of the arrayed emitter structures, which is accomplished as discussed previously. Advantageously, the protrusion height of the nanotubes is at least 10 times the nanotube diameter, preferably at least 100 nm. The density of the protruding nanotubes is at least 10–5%, advantageously at least 10–3%, more advantageously at least 1%, of the area of the surface of the emitter structures.

The final step in FIG. 4 (block G) is to assemble the array emitter structure into a field emission device by incorporating grid, anode, phosphor (for displays) and other components including electrical, vacuum-related, and structural parts, as known in the art.

Devices Incorporating Nanotube Emitter Structures

The emitter structures formed as discussed above are useful for a variety of devices, including microwave vacuum tube devices and flat panel field emission devices. Because efficient electron emission at low applied voltages is typically achieved by the presence of accelerating gate electrode in close proximity to the emitting source (typically about 1–10 $\mu$m distance), it is advantageous to have numerous gate apertures in an emitter structure to enhance the capability of the structure. Specifically, a fine-scale, micron-sized gate structure with numerous gate apertures is advantageous for attaining high emission efficiency.

Accordingly, in one embodiment of the invention, a grid structure is formed in front of the nanotube emitter structure described herein. The grid is a conductive element placed between the electron emitting cathode and the anode. It is separated from the cathode but sufficiently close to the nanotube emitter to excite emissions (typically within 10 μm of the emitting nanotube tips). Yet, this close spacing is possible only if the emitter tips have relatively uniform height. As discussed previously, the fabrication process of the invention provides nanotube tips exhibiting such uniformity.

The grid is generally separated from the cathode by an electrically insulating layer such as aluminum oxide or silicon dioxide. Advantageously, the grid structure in the invention contains an electrically conducting layer, e.g., a thin film or thin foil, with a multitude of apertures. Within each aperture, a multiplicity of nanotubes emit electrons when a field is applied between the cathode and the grid.

The dimension of the grid apertures is typically in the range of 0.05–100 μm in average maximum dimension (e.g., diameter), advantageously at least 0.1 μm, and more advantageously at least 0.2 μm to ease manufacturing. The average maximum dimension is advantageously no more than 20 μm, more advantageously no more than 5 μm in order to increase the density of grid apertures, and reduce the voltage necessary to achieve electron emission. Circular apertures are advantageous in that they provide a desirable collimated electron beam with relatively low perpendicular momentum spread. The thickness of the grid conductor is typically in the range of 0.05–100 μm, advantageously 0.05–10 μm. The grid conductor material is typically chosen from metals such as Cu, Cr, Ni, Nb, Mo, W or alloys thereof, but the use of conductive ceramic materials such as oxides, nitrides, and carbides is also possible. The apertured (or perforated) grid structure is typically prepared by conventional thin film deposition and photolithographic etching.

Figure 6:
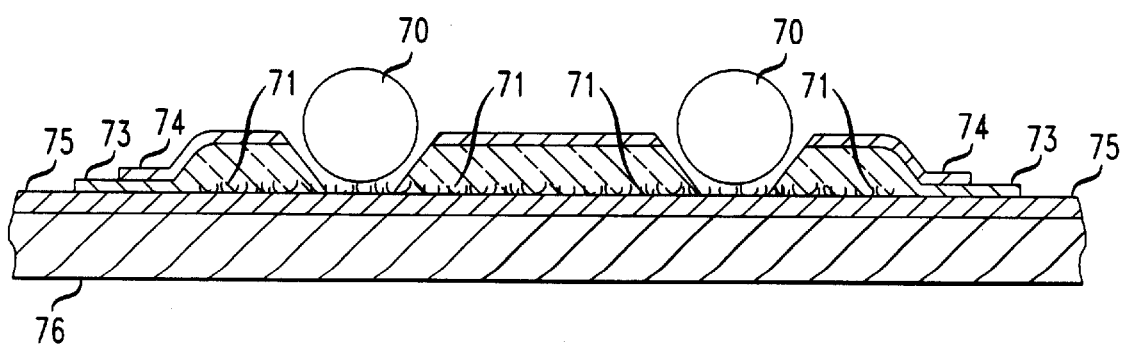
FIG. 6 is a schematic cross-sectional diagram of a nanotube cathode formed according to the invention.

Advantageously the grid is a high density apertured gate structure such as described in U.S. Pat. Nos. 5,681,196 and 5,698,934, the disclosures of which are hereby incorporated by reference. The combination of very fine and high-density nanotube emitters with a high-density gate aperture structure is particularly advantageous. Such a high density gate aperture structure is conveniently formed by utilizing micron or submicron sized particle masks. Specifically, after formation of the nanotube emitter structure, mask particles (metal, ceramic, or plastic particles typically having maximum dimensions less than 5 μm and advantageously less than 1 μm) are applied to the emitter surface, e.g., by spraying or sprinkling. A dielectric film layer such as $SiO_2$ or glass is deposited over the mask particles as by evaporation or sputtering. A conductive layer such as Cu or Cr is deposited on the dielectric. Because of the shadow effect, the emitter areas underneath each mask particle have no dielectric film. The mask particles are then easily brushed or blown away, leaving a gate electrode having a high density of apertures. FIG. 6 illustrates such a particle mask technique. The mask particles 70 are located above the protruding nanotube emitters 71. Upon deposition of the insulating layer 73 and the grid conductor layer 74 onto conductor 75 on substrate 76, the mask particles 70 block portions of the nanotube emitters 71. When the mask particles 70 are removed, nanotubes 71 are exposed through the resultant apertures. The resultant structure is then capable of being incorporated into a device.

Figure 7:
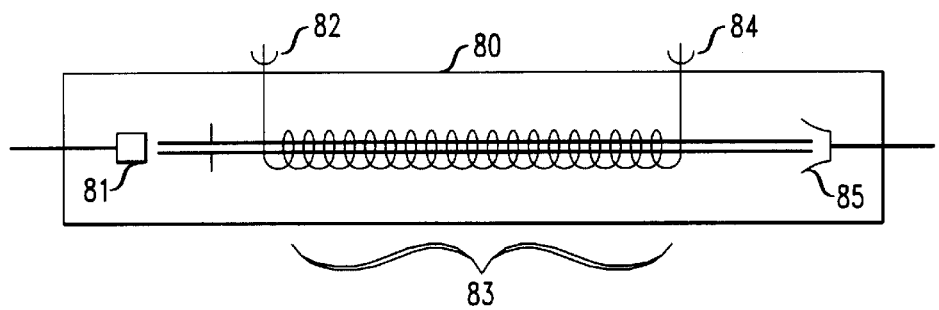
FIG. 7 is a schematically illustration of a traveling wave tube structure.

FIG. 7 is a schematic cross section of a typical microwave vacuum tube device—here a traveling wave tube (TWT). The tube device contains an evacuated tube 80, a source of electrons in the form of an electron gun 81, an input window 82 for introducing a microwave input signal, an interaction structure 83 where the electrons interact with the input signal, and a microwave output window 84 where microwave power derived from the electrons is taken out of the tube. In the case of a TWT, other components include a focusing magnet (not shown) to focus the beam of electrons through the interaction structure 83, a collector 85 to collect the electron beam after the output microwave power has been generated and an internal attenuator (not shown) to absorb microwave power reflected back into the tube from mismatches in the output. For a TWT, the interaction region 83 is typically a conductive helix for broadband applications and a coupled-cavity region for high power applications.

Figure 8:
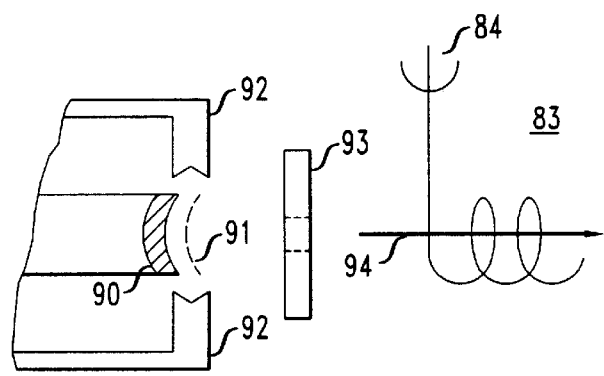
FIG. 8 is an enlarged view of the electron gun structure of the traveling wave tube of FIG. 7.

The electron gun 81 is an electron source that generates, accelerates and focuses an electron beam to follow a desired trajectory after it leaves the gun. FIG. 8 schematically illustrates a conventional electron gun comprising a thermionic cathode 90, one or more grids 91 for inducing emission of electrons, focusing electrodes 92 for focusing the electrons into a beam, and apertured anode 93 for further directing the beam 94 into interaction structure 83. For TWT applications, a long, thin electron beam at relatively low voltage and high current density is advantageous. Electron guns range in configuration from a planar cathode faced by a planar anode to more elaborate designs such as Pierce guns, conical diode electrodes, concentric cylinders or spherical cap cathodes. (See, e.g., A. W. Scott, supra.)

In operation of the device shown in FIGS. 7 and 8, an electron beam 94 is accelerated from the cathode 90 by high voltages applied to grids 91 and anode 93. The electron beam is then shot into the interaction structure 83 where it interacts with the microwave input signal such that the beam 94 is amplified as the electrons and the signal travel together through the interaction structure 83. The electrons advantageously travel at the same velocity as the microwave signal on the interaction structure 83. The power of the input signal modulates the electron beam 94, and the modulated electron beam 94 generates an amplified form of the input signal at the output 84.

The cathode 90 and grid 91 are the source of electrons for the electron beam in the TWT of FIG. 6. The cathode advantageously has the following properties and capabilities: (1) exhibit a surface able to emit electrons freely without the necessity of external excitation such as heating or bombardment, (2) supply a high current density, (3) long operating life with its electron emission continuing substantially unimpaired, (4) allow production of a narrow beam with a small spread in electron momentum, and (5) allow production of a modulated electron beam at or near the cathode. In contrast to conventional thermionic cathodes, cold cathodes comprising protruding nanotube emitters exhibit these properties. Specifically, nanotube-based cold cathodes are capable of fast, room-temperature emission when an electric field is applied. They allow the production of a modulated electron beam over a distance of a few microns (as in the case of beam modulation performed directly by the grids), permitting the use of a shortened interaction region and resulting in a lighter, more compact device.

When using nanotube-based cold cathodes in microwave vacuum tube devices, it is desired to keep electron beam spread within a reasonable level. Electrons emerge from the cathode surface with a nonzero velocity and at various angles to the surface normal. The field-emitted electrons thus have a distribution of momentum values in the direction of electron beam trajectory. These effects—random emission of electrons, undesirable momentum perpendicular to the path from the cathode to the anode and the resulting crossing of electron trajectories on the microscopic scale—all reduce the performance of the microwave amplifier by giving rise to shot noise as well as the minimum diameter that a convergent beam can attain. It is therefore desirable to inhibit electron beams from different apertures in the grid from merging unless the electron beams are nearly parallel. Specifically, if the beams merge while individually diverging, the phase space density of the resultant beam will be lowered, because at any given point electrons are found with a variety of different momenta.

It is possible to reduce the divergence angle of the electrons from each aperture by creating an electrostatic lens in the aperture. However, Liouville's Theorem constrains the extent to which a lens is able to reduce the perpendicular momentum spread. If the emitting area is equal to the lens aperture, then no substantial improvement is obtained. If the emitting area is smaller than the lens aperture, it is possible to reduce the perpendicular momentum distribution (with proper lens design) by the ratio of the radius of the emitting area to the radius of the lens.

It is therefore desirable to allow emission only from small spots near the center of each aperture, i.e. at most 70% of the area and advantageously at most 50% of the area of the aperture. It is possible to control the emission by patterning the substrate so that for a plurality of the emitting apertures, only a small area (smaller than the aperture area) is electrically conductive. It is also possible to control emission by controlling the nanotube incorporation process such that only the central area within the emitting aperture is activated and emits electrons, e.g., by depositing a non-emissive overlayer on the nanotube emitters everywhere but at the center of the apertures.

Figure 9:
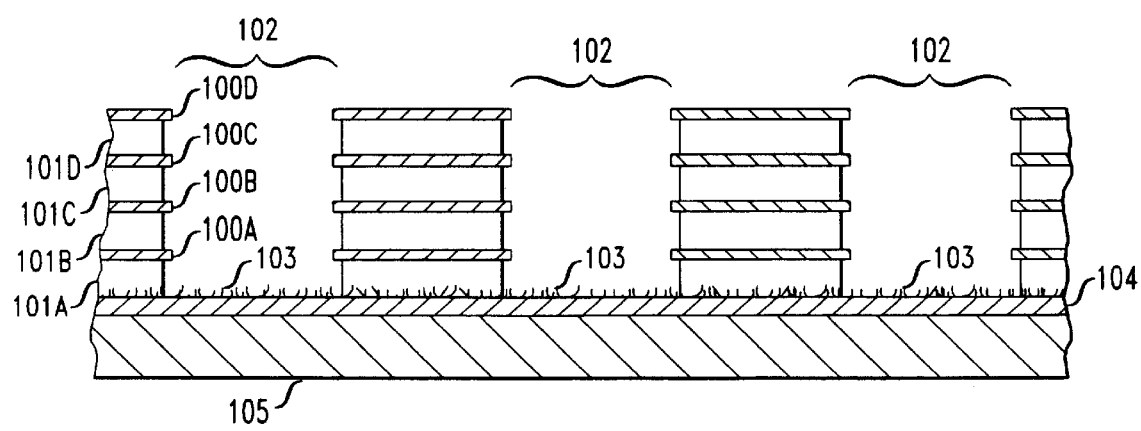
FIG. 9 shows a multiple grid structure designed for extracting, accelerating and focusing an electron beam from a nanotube cathode surface according to the invention.

The invention provides an improved technique for reducing the divergence angle. According to the invention, a multilayer, apertured grid is used in which the first grid is operated at a negative potential. The first grid is typically 0.05 to 10 of its average maximum aperture dimension (e.g., diameter in the case of round apertures) above the cathode, advantageously 0.3 to 2. Typically, the apertures are round and have a diameter of 0.05 to 100 $\mu$m, advantageously at least 0.1 $\mu$m, more advantageously at least 0.2 $\mu$m. This first grid reduces the electric field at the cathode surface, near the edge of the hole, and thereby suppresses emission preferentially from the edge. Successive grids typically exhibit positive voltages relative to the cathode. The multilayer grid structure has at least two layers and advantageously at least 4 layers of grid conductors, as illustrated in FIG. 9. Grid conductors 100A, 100B, 100C, 100D are separated by insulators 101A, 101B, 101C, 101D, and define aligned apertures 102. Nanotube emitters 103 located within each aperture 102 are supported by a cathode conductor 104, which is located on a substrate 105. The grid conductors 100A–100D allow the electron beams to be focused during traveling. The first grid layer closest to the emitters (100A) is generally biased negative to reduce the perpendicular momentum through suppression of field emission near the edge of the grid apertures 102. A negative bias on the first grid also focuses a diverging electron beam into one that has momenta more nearly parallel to the surface normal. (A single grid provides similarly useful properties if the field applied by the anode is sufficiently large to force emission even in the presence of negative charged grid. However, multiple grids are advantageous in reducing the required voltage on the anode, and in providing a better collimated electron beam.)

The multilayered grid structure is prepared by conventional thin film deposition and photolithographic techniques. It is also possible to prepare the grid structures of FIG. 9 by a particle mask technique as discussed previously, as illustrated in FIGS. 10 and 11. The thickness of the grid conductor layers 100A–100D is typically in the range of 0.05 to 100 $\mu$m, advantageously 0.1 to 10 $\mu$m. The grid conductor layers are generally selected from a metal such as Cu, Cr, Ni, Nb, Mo, W, or alloys thereof, but the use of conductive ceramics such as oxides, nitrides, and carbides is also possible. The insulator layers 101A–101D are typically formed from materials such as silica or glass.

Figure 10:
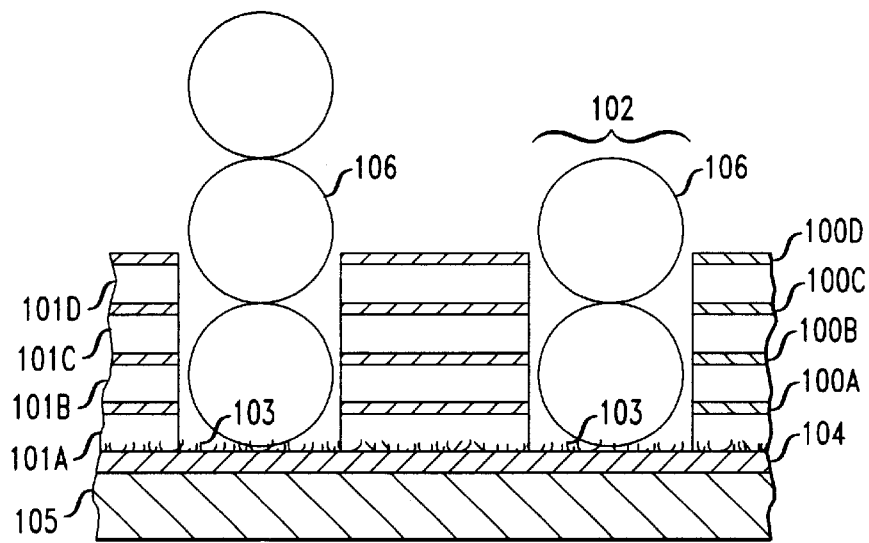
FIG. 10 schematically illustrates preparation of a multilayer grid structure using magnetic mask particle stacks according to the invention.

In FIG. 10, the mask particles 106 are typically ferromagnetic (e.g. Fe, Ni, Co, or their alloys). Desirable particle size is typically in the range of 0.1–20 $\mu$m in average diameter. During the placement of the particles, e.g. by sprinkling onto the nanotube emitter structure, a vertical magnetic field is applied, which causes the ferromagnetic particles 106 to form a vertically elongated chain-of-spheres containing at least 2 particles. Some chains-of-spheres may have more particles than others, but this does not affect the process of depositing the multilayer grid structure. After alternating deposition of insulating spacer film (101A–101D) and the grid conductor film (100A–100D) into multilayer stacks, the ferromagnetic particles 106 are removed, e.g., by magnetically pulling away using a permanent magnet, or by chemical etching.

Figure 11:
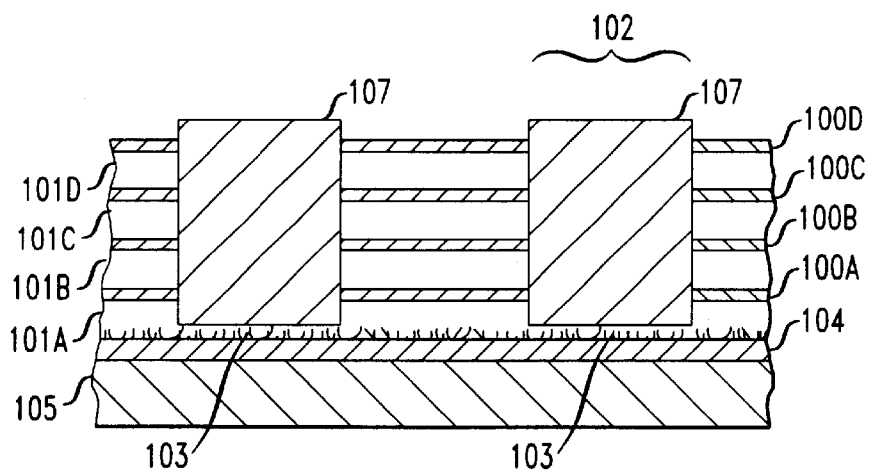
FIG. 11 schematically illustrates the preparation of a multilayer grid using elongated mask particles according to the invention.

An alternative particle mask approach is schematically illustrated in FIG. 11. In this alternative approach, elongated or prolate ferromagnetic particles 107 are sprinkled in the presence of vertical magnetic field so that they stand up vertically to serve as mask particles during the deposition of the multilayer grid structure (100A–100D and 101A–101D) on substrate 105, conductor layer 104 and nanotube emitters 103. The particle mask is then removed as discussed previously. The elongated mask particles 107 typically have an average axial maximum dimension, e.g., diameter, in the range of 0.1–20 $\mu$m. It is possible to prepare the particles 107, for example, by thin film deposition (e.g. by sputtering, evaporation, electroless plating) of the mask material through a perforated template (not shown) placed at a desired height above the nanotube emitters. Suitable materials for the elongated mask particles 107 include metals such as Cu, Al, Ni, easily water or solvent dissolvable polymers (e.g., polyvinyl acetate, polyvinyl alcohol, polyacrylamide, acrylonitrile-butadiene-styrene or ABS), volatile polymers (e.g., PMMA), or easily dissolvable salts (e.g., NaCl). After deposition of the particles, the template is removed, and the multilayer grid structure formed.

The cathode and gate structure of FIG. 9, as used in a microwave amplifier, is not necessarily flat in surface geometry. It is possible to use a reshaped bulk nanotube composite emitter, or a curved substrate having thin film array emitters deposited thereon. The curved substrate is prepared, for example, by etching or mechanical polishing (e.g., in the case of materials such as Si) or by plastic deformation (e.g., in the case of ductile metals such ad Cu. Mo, Nb, W, Fe, Ni, or alloys thereof).

Advantageously, the nanotube-containing cathode and multilayer grid structure of FIG. 9 is used in a TWT, instead of a thermionic emission cathode. Also, the cathode/grid structure of FIG. 9 is advantageously slightly concave for focusing the emitted electrons into a beam.

The nanotube emitter structure of FIG. 9 reduces the perpendicular momentum spread of electrons emitting from the cathode due to four features. (1) Low voltage emission is desirable to have reduced beam spreading. If the emitter geometry is held constant, the perpendicular momentum spread scales as the square root of the emission voltage. The use of protruding nanotube emitters allows low voltage emission and hence reduced perpendicular momentum in microwave amplifier operation. (2) Electron emission is restricted to the central area portion, which is much smaller than the entire grid aperture area. (3) The electron beam is focused by the stack of the multilayer grid structure. (4) A concave substrate further focuses the electron beam.

It is also possible to use the nanotube-based emitters of the invention to fabricate a flat panel, field emission display. Such a field emission display is constructed, for example, with a diode design (i.e., cathode-anode configuration) or a triode design (i.e., cathode-grid-anode configuration). Advantageously, a grid electrode is used, more advantageously a high density aperture gate structure placed in proximity to the nanotube emitter cathode, as discussed previously.

For display applications, emitter material (the cold cathode) in each pixel of the display desirably consists of multiple emitters for the purpose, among others, of averaging out the emission characteristics and ensuring uniformity in display quality. Because of the nanoscopic nature of the carbon nanotubes, the emitter provides many emitting points, typically more than $10^4$ emitting tips per pixel of 100×100 $\mu m^2$, assuming 50% nanotube density with a tubule diameter of 10–100 nm. Advantageously, the emitter density in the invention is at least $1/\mu m^2$, more advantageously at least $10/\mu m^2$. Because efficient electron emission at low applied voltage is typically achieved by the presence of accelerating gate electrode in close proximity (typically about 1 micron distance), it is useful to have multiple gate apertures over a given emitter area to utilize the capability of multiple emitters. It is also desirable to have fine-scale, micron-sized structure with as many gate apertures as possible for increased emission efficiency.

Figure 12:
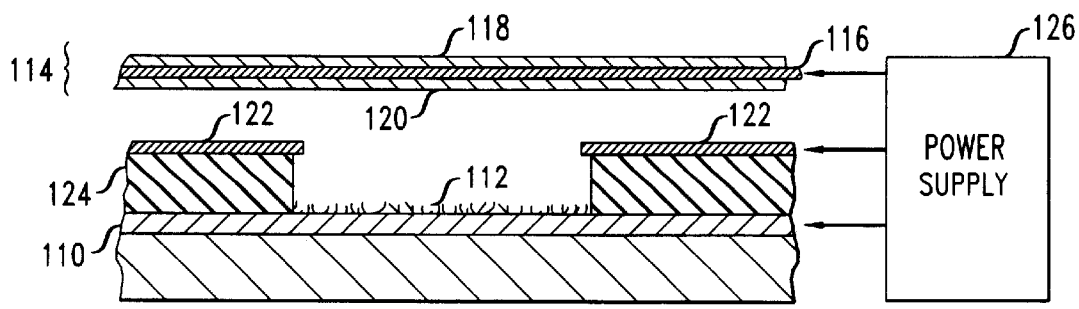
FIG. 12 is a schematic illustration of a flat panel field emission display according to the invention.

FIG. 12 illustrates a flat panel field emission display using a nanotube emitter structure of the invention. The display contains a cathode 110 including a plurality of nanotube emitters 112 and an anode 114 disposed in spaced relations from the emitters 112 within a vacuum seal. The anode conductor 116 formed on a transparent insulating substrate 118 is provided with a phosphor layer 120 and mounted on support pillars (not shown). Between the cathode and the anode and closely spaced from the emitters is a perforated conductive gate layer 122. Conveniently, the gate 122 is spaced from the cathode 110 by an insulating layer 124.

The space between the anode and the emitter is sealed and evacuated, and voltage is applied by power supply 126. The field-emitted electrons from the nanotube emitters 112 are accelerated by the gate electrode 122, and move toward the anode conductor layer 116 (typically a transparent conductor such as indium-tin oxide). As the accelerated electrons hit the phosphor layer 120, a display image is generated.

Other embodiments of the invention will be apparent to those skilled in the art from consideration of the specification and practice of the invention disclosed herein.

What is claimed is:

1. A process for fabricating a device comprising a field emission structure, comprising the steps of:
    forming an ingot of a composite material comprising substantially randomly distributed carbon nanotubes and a matrix material;
    etching the matrix material constituent of the composite material such that at least a portion of the nanotubes protrude from a surface of the ingot to an average protrusion distance at least twice the average diameter of the nanotubes in the composite material.

2. The process of claim 1, wherein the matrix material is a conductive material.

3. The process of claim 2, wherein the step of forming the ingot comprises mixing the carbon nanotubes and a powder comprising the conductive material, and sintering the compact.

4. The process of claim 2, wherein the step of forming the ingot comprises placing the carbon nanotubes with a solid block of metal, melting the metal such that the molten metal and nanotubes become intermixed, and resolidifying the metal.

5. The process of claim 1, further comprising a step selected from sectioning or grinding the ingot prior to the etching step.

6. The process of claim 5, further comprising a step of shaping the sectioned or ground surface of the ingot prior to the etching step.

7. The process of claim 1, wherein the protruding nanotubes are aligned in substantially the same direction subsequent to the etching step.

8. The process of claim 1, wherein the etched ingot comprises at least $10^{-7}$ volume fraction of nanotubes to a depth of at least 2 $\mu m$ from the surface from which the nanotubes protrude.

9. The process of claim 8, wherein the composite material comprises at least $10^{-5}$ volume fraction of nanotubes to a depth of at least 2 $\mu m$ from the surface from which the nanotubes protrude.

10. The process of claim 1, wherein the average protrusion is at least ten times the average diameter of the nanotubes in the composite material.

11. The process of claim 2, wherein the conductive material comprises at least one metal selected from Au, Ag, Pd, Pt, Cu, Ni, Fe, Co, Mo, W, V, Si, Ti, Sn, Al, Sb, In, Bi, and Pb.

12. The process of claim 2, wherein the nanotubes comprise a metallized surface layer.

13. The process of claim 12, wherein the metallized surface layer comprises at least one of nickel, copper, silver, and gold.

14. The process of claim 2, wherein the nanotubes comprise at least $10^{-5}$% of the surface from which the nanotubes protrude.

15. The process of claim 14, wherein the nanotubes comprise $10^{-3}$ to 0.1% of the surface from which the nanotubes protrude.

16. The process of claim 3, wherein the powder has an average smallest dimension of less than 1 $\mu m$.

17. The process of claim 3, wherein the step of mixing comprises a process selected from dry mixing, wet mixing, and dissolving the powder in an acid or base solution.

18. The process of claim 3, wherein the step of compacting the mixture comprises at least one of pressing, sintering, and melting and resolidification.

19. The process of claim 18, wherein sintering is performed at a temperature ranging from 0.5 to 0.8 times the melting temperature of the conductive material.

20. A process for fabricating a device comprising an arrayed field emission structure, comprising the steps of:
    providing a substrate comprising an arrayed pattern of conductive metal pads, each of the pads coated with nanotube-wettable solder;
    depositing a mixture comprising liquid and carbon nanotubes onto the metal pads;

heating the solder such that the nanotubes are partially submerged in the solder; and etching the solder material such that at least a portion of the nanotubes protrude from a surface of the solder to an average protrusion distance at least twice the average diameter of the nanotubes in a composite material.

21. The process of claim 20, wherein the nanotubes in the mixture are substantially metallized.

22. The process of claim 20, wherein the mixture contains a liquid carrier and a binder.

* * * * *